United States Patent
Wada et al.

(10) Patent No.: US 8,647,525 B2
(45) Date of Patent: Feb. 11, 2014

(54) FERRITE COMPOSITION AND ELECTRONIC COMPONENT

(75) Inventors: Ryuichi Wada, Tokyo (JP); Shou Kawadahara, Tokyo (JP); Yukio Takahashi, Tokyo (JP); Raitarou Masaoka, Tokyo (JP); Takashi Suzuki, Tokyo (JP); Hiroshi Momoi, Tokyo (JP)

(73) Assignee: TDK Corporation, Tokyo (JP)

( * ) Notice: Subject to any disclaimer, the term of this patent is extended or adjusted under 35 U.S.C. 154(b) by 318 days.

(21) Appl. No.: 13/048,436

(22) Filed: Mar. 15, 2011

(65) Prior Publication Data

US 2011/0226982 A1 Sep. 22, 2011

(30) Foreign Application Priority Data

Mar. 16, 2010 (JP) .................................. 2010-059759
Feb. 1, 2011 (JP) .................................. 2011-020030

(51) Int. Cl.
C04B 35/26 (2006.01)
C04B 35/64 (2006.01)

(52) U.S. Cl.
USPC ..................................... 252/62.58; 252/62.59

(58) Field of Classification Search
USPC ......... 252/62.51 R, 62.56, 62.58, 62.59, 62.6
See application file for complete search history.

(56) References Cited

U.S. PATENT DOCUMENTS 5,476,728 A * 12/1995 Nakano et al. ................ 428/815
5,855,810 A 1/1999 Kim
2006/0091352 A1 * 5/2006 Nagaoka et al. ............ 252/62.57
2010/0085140 A1 4/2010 Tanaka et al.
2010/0163779 A1 7/2010 Okano et al.

FOREIGN PATENT DOCUMENTS

| CN | 101652336 A | 2/2010 |
|---|---|---|
| JP | 2000208316 A * | 7/2000 |
| JP | A-2000-208316 | 7/2000 |
| JP | A-2003-272912 | 9/2003 |
| JP | A-2004-172396 | 6/2004 |
| JP | A-2005-145781 | 6/2005 |
| JP | A-2005-213092 | 8/2005 |
| JP | A-2007-145703 | 6/2007 |
| JP | A-2008-290931 | 12/2008 |
| JP | A-2010-103266 | 5/2010 |

OTHER PUBLICATIONS

Machine translation of JP2000-208316A.*
Search Report issued in European Application No. EP 11 15 8439 dated Jun. 9, 2011.

* cited by examiner

Primary Examiner — Emily Le
Assistant Examiner — Lynne Edmondson
(74) Attorney, Agent, or Firm — Oliff PLC (57) ABSTRACT

A ferrite composition includes a main component having 46.0 to 49.8 mol % of an iron oxide in terms of $Fe_2O_3$, 5.0 to 14.0 mol % of a copper oxide in terms of CuO and 8.0 to 32.0 mol % of a zinc oxide in terms of ZnO, and a remainder of the main component is composed of a nickel oxide; and as subcomponents, with respect to 100 wt % of the main component, 0.5 to 6.0 wt % of a silicon oxide in terms of $SiO_2$ and 0.01 to 2.0 wt % of a boron oxide in terms of $B_2O_3$. Further, as a subcomponent, 0.01 to 0.17 wt % of potassium oxide in terms of $K_2O$ or 0.3 to 2.0 wt % of tin oxide in terms of $SnO_2$ may be included.

12 Claims, 6 Drawing Sheets

Sample 4

FERRITE COMPOSITION AND ELECTRONIC COMPONENT

BACKGROUND OF THE INVENTION

1. Field of the Invention

The present invention relates to a ferrite composition preferably used for electronic components such as an inductor element and the like, and an electronic component such as an inductor element to which said ferrite composition is applied.

2. Description of the Related Art

In recent years, reduction in size and weight for various kinds of electronic apparatuses such as a portable apparatus and the like are progressed rapidly. In order to respond this situation, demands of reduction in size and weight, and high performance for electronic components used for electric circuits of various kinds of electronic apparatuses are rapidly increased.

In an electronic component such as an inductor element, a number of ferrite compositions having good magnetic characteristic are used as a magnetic material.

Such material needs to show not only high magnetic permeability but also a small decrease in magnetic permeability to which direct current (DC) is applied, namely, a good superposed DC characteristic.

For example, Japanese Patent Publication No. 2005-145781 discloses that by adding specific amount of silicon or silica to NiCuZn based ferrite, inductance to which direct current is superposed is increased.

Also, Japanese Patent Publication No. 2005-213092 discloses that by adding specific amounts of $ZrO_2$ and $SiO_2$ to NiCuZn based ferrite, resistance property to thermal shock and the like are increased.

Meanwhile, an electric apparatus to which electronic components such as an inductor element and the like are mounted, is used under various environments, it is required that change of magnetic permeability of the inductor element is small through wide temperature range, namely, a temperature characteristic of the magnetic permeability is good.

Also, when a multilayer inductor is composed of the inductor, the multilayer inductor needs to be fired at a lower temperature which is lower than a melting point of Ag which is generally used as a coil conductor (for example, 900° C. or so).

However, in the Japanese Patent Publication No. 2005-145781, a temperature characteristic of the magnetic permeability is not considered at all. Also, although it is described that, due to atomization of raw materials, it is possible to fire the ferrite at 900° C. or so by adding $SiO_2$ only. However, that has been in fact difficult to be achieved.

Also, in the Japanese Patent Publication No. 2005-213092, in addition that the temperature characteristic of the magnetic permeability is not considered at all, and a firing temperature is 1000° C. or more, it was difficult to perform a lower temperature firing.

BRIEF SUMMARY OF THE INVENTION

The present invention has been made by considering such situation, and a purpose of the invention is to provide a ferrite composition having good initial permeability, good superposed direct current characteristic and comparatively good temperature characteristic of the initial permeability, and achieving low temperature firing, and an electronic component having the ferrite composition.

In order to achieve the above purpose, a ferrite composition according to the present invention includes a main component having 46.0 to 49.8 mol % of an iron oxide in terms of $Fe_2O_3$, 5.0 to 14.0 mol % of a copper oxide in terms of CuO and 8.0 to 32.0 mol % of a zinc oxide in terms of ZnO, and a remainder of the main component is composed of a nickel oxide. The ferrite composition also includes, as subcomponents, with respect to 100 wt % of the main component, 0.5 to 6.0 wt % of a silicon oxide in terms of $SiO_2$ and 0.01 to 2.0 wt % of a boron oxide in terms of $B_2O_3$.

By setting the contents of oxides composing the main component within the above range, and further, as the subcomponents, by setting the contents of the silicon oxide and boron oxide within the above range, ferrite composition having comparatively good initial permeability, good superposed direct current characteristic and comparatively good temperature characteristic of an initial permeability, and achieving low temperature firing can be obtained.

A possible reason is that such effect is largely influenced by a combined effect obtained by coexisting the silicon oxide and boron oxide within the above range.

Preferably, the ferrite composition also includes, as a subcomponent, 0.01 to 0.17 wt % of a potassium oxide in terms of $K_2O$ with respect to 100 wt % of the main component.

Preferably, the ferrite composition also includes, as a subcomponent, 0.3 to 2.0 wt % of a tin oxide in terms of $SnO_2$ with respect to 100 wt % of the main component.

By further including these subcomponents, the above mentioned effects can be improved further.

Preferably, an average crystal particle size of a sintered body using the ferrite composition is 0.2 to 1.3 μm. By controlling the average crystal particle size within the above range, the above mentioned effects can be improved further.

An electronic component according to the present invention includes the ferrite composition described any one of the above.

As for the electronic component according to the present invention, although it is not particularly limited, an inductor element, a core for transformer, a ferrite tile and the like are exemplified. As for the electronic component according to the present invention, a multilayer composite electronic component including a multilayer inductor or an inductor part is preferable since the ferrite composition according to the present invention can be fired at low temperature.

DETAILED DESCRIPTION OF THE INVENTION

Below, the present invention will be specified based on embodiments shown in drawings.

A ferrite composition according to the present embodiment is NiCuZn based ferrite, and includes an iron oxide, a copper oxide, a zinc oxide and a nickel oxide as a main component. In 100 mol % of the main component, a content of the iron oxide is 46.0 to 49.8 mol %, preferably 46.5 to 49.0 mol % in terms of $Fe_2O_3$. When the content of the iron oxide is too little, a temperature characteristic of initial permeability tends to be deteriorated. When it is too much, the initial permeability tends to decrease.

In 100 mol % of the main component, a content of the copper oxide is 5.0 to 14.0 mol %, preferably 7.0 to 13.0 mol % in terms of CuO. When the content of copper oxide is too little, the initial permeability tends to decrease. When it is too much, the temperature characteristic of initial permeability tends to be deteriorated.

In 100 mol % of the main component, a content of the zinc oxide is 8.0 to 32.0 mol %, preferably 12.0 to 30.0 mol % in terms of ZnO. When the content of the zinc oxide is too little, the initial permeability tends to decrease. When it is too much, the initial permeability decreases rapidly as well as the temperature characteristic of initial permeability tends to be deteriorated.

A remainder of the main component is composed of the nickel oxide.

The ferrite composition according to the present embodiment includes, in addition to the above main component, a silicon oxide and a boron oxide as subcomponents.

A content of the silicon oxide is 0.5 to 6.0 wt %, preferably 1.0 to 4.0 wt %, more preferably 1.0 to 3.0 wt % in terms of $SiO_2$ with respect to 100 wt % of the main component. When the content of the silicon oxide is too little, the superposed DC characteristic tends to decrease. When it is too much, a sinterability tends to be deteriorated.

A content of the boron oxide is 0.01 to 2.0 wt %, preferably 0.01 to 1.0 wt %, more preferably 0.03 to 0.50 wt % in terms of $B_2O_3$ with respect to 100 wt % of the main component. When the content of the boron oxide is too little, the sinterability tends to be deteriorated. When it is too much, abnormal grain growth occurs so that the superposed DC characteristic tends to decrease.

In the ferrite composition according to the present embodiment, in addition to compositional range of the main component is controlled within the above range, the above silicon oxide and boron oxide are included as subcomponents. As a result, ferrite composition having good initial permeability, and good superposed DC characteristic as well as having comparatively good temperature characteristic of the initial permeability can be obtained. Further, by including not only the silicon oxide but also the boron oxide as the subcomponents, the sintering temperature can be lowered and low temperature firing can be possible.

Note that, when the silicon oxide or the boron oxide is included by itself, the above effect cannot be obtained sufficiently. Namely, it is considered that the above effect is a combined effect first obtained if certain amounts of the silicon oxide and the boron oxide are included simultaneously.

The ferrite composition according to the present embodiment preferably further includes, as a subcomponent, a potassium oxide. A content of the potassium oxide is preferably 0.01 to 0.17 wt %, more preferably 0.01 to 0.07 wt % in terms of $K_2O$ with respect to 100 wt % of the main component. By setting the content of the potassium oxide within the above range, an effect of improving the superposed DC characteristic can be obtained. Note that, the above effect cannot be obtained even if a lithium oxide and a sodium oxide are included.

The ferrite composition according to the present embodiment preferably further includes, as a subcomponent, a tin oxide. A content of the tin oxide is preferably 0.3 to 2.0 wt % in terms of $SnO_2$ with respect to 100 wt % of the main component. By setting the content of the tin oxide within the above range, an effect of improving the superposed DC characteristic can be obtained. Note that, the above effect cannot be obtained even if a titanium oxide is included.

Also, the ferrite composition according to the present embodiment may include both the potassium oxide and the tin oxide. Namely, the ferrite composition may include the silicon oxide, the boron oxide, the potassium oxide and the tin oxide.

Even in this case, it is preferable to set contents of the potassium oxide and the tin oxide within the above range. The potassium oxide tends to exist with covering an outside of crystal particle (ferrite particle) whose the main component is NiCuZn ferrite while the tin oxide tends to be solid-soluted in the ferrite particle, thus they does not adversely affect each other.

Also, the ferrite composition according to the present invention may include oxides of an unavoidable impurity element.

Specifically, as for the unavoidable impurity elements, C, S, Cl, As, Se, Br, Te and I; and main group metal elements such as Li, Na, Mg, Al, Ca, Ga, Ge, Sr, Cd, In, Sb, Ba, Pb, Bi and the like; and transition metal elements such as Sc, Ti, V, Cr, Co, Y, Nb, Mo, Pd, Ag, Hf, Ta and the like are exemplified. Also, the oxide of the unavoidable impurity elements may be included as far as content thereof is 0.05 wt % or less or so in the ferrite composition.

The ferrite composition according to the present embodiment contains a ferrite particle and a grain boundary which exists between adjacent crystal particles. An average particle size of the crystal particle is preferably 0.2 to 1.3 μm.

Note that, if the potassium oxide is included in the ferrite composition as a subcomponent, the average crystal particle size is preferably 0.2 to 1.3 μm.

Also, if the potassium oxide is not included in the ferrite composition as a subcomponent, the average crystal particle size is preferably 0.2 to 1.1 μm.

By setting the average crystal particle size within the above range, an effect of maintaining the magnetic permeability and superposed DC characteristic as good can be obtained.

The average crystal particle size can be obtained by observing a cutting plane of the sintered body (ferrite composition), for example, with SEM, measuring crystal particle sizes of the predetermined number of crystal particles and calculating based on the measurement results. Note that, a crystal particle size of each crystal particle can be obtained by, for example, calculating a circle equivalent diameter (Heywood diameter) which is assumed as a diameter of circle whose area corresponds to an area of each crystal particle. Also, the number of particles whose average crystal particle size is measured is normally 100 or more.

Next, one example of producing method of ferrite composition according to the present embodiment will be specified. Firstly, starting materials (materials of a main component and materials of subcomponents) are prepared. Although the materials of the main component and subcomponents are not particularly limited, it is preferable to use the following.

As for the materials of the main component, iron oxide ($\alpha$-$Fe_2O_3$), copper oxide (CuO), zinc oxide (ZnO) and nickel oxide (NiO) or composite oxides thereof can be used. Further, various compounds which become the above oxide or composite oxide by firing can be used. As for the compounds which become the above oxide by firing, for example, metal, carbonate, oxalate, nitrate, hydroxide, halide, organic metal compounds and the like are exemplified.

As for the materials of subcomponents, oxides (silicon oxide, boron oxide, tin oxide) or carbonates (potassium carbonate) can be used. Also, as for the oxides, various compounds which become the above oxide or composite oxide by firing can be used. As for the compounds which become the above oxide by firing, for example, metal, carbonate, oxalate, nitrate, hydroxide, halide, organic metal compounds and the like are exemplified. For example, as for the material of the silicon oxide, silicone resin, silicon and organic silane may be used.

Further, although a form of the material of subcomponents is not particularly limited, it may be a powder, or a liquid material such as colloidal material and the like. Further, the material of subcomponents may be crystalline or amorphous.

As for the material of the above mentioned subcomponents, it is preferable to use fine powder or particles. By using the fine powder, ferrite composition having fine structure where the degree of dispersion of the subcomponents and average crystal particle size of the crystal particle in the ferrite composition after firing are controlled, can be obtained.

In particular, as for a material of the silicon oxide, it is preferable to use the fine powder. Specifically, a particle size of the material powder (average particle size of material) is preferably 0.01 to 0.40 μm.

Also, it is preferable to use the fine powder as a material of the boron oxide. Specifically, an average particle size of the material of the boron oxide powder is preferably 0.01 to 0.40 μm. The fine powder of the silicon oxide tends to be hardly dispersed, thus by using the fine powder of the boron oxide, a dispersibility of the fine powder of the silicon oxide can be improved and the above mentioned combined effect can be improved further.

Firstly, the prepared starting materials are weighed so as to be a predetermined composition ratio, and mixed so that a mixture of materials is obtained. As for a method for mixing, for example, wet-mixing using a ball mill and dry-mixing using a dry mixer are exemplified. Note that, it is preferable to use the starting material having average particle size of 0.1 to 3 μm.

Next, the mixture of materials is calcined so as to obtain a calcined material. The calcination is performed to cause thermal decomposition of the materials, homogenization of the components, generation of ferrite, elimination of superfine powder due to sintering and grain growth to appropriate particle size, in order to convert the mixture of materials to a suitable form for later processes. This calcination is performed preferably at a temperature of 600 to 800° C., normally for 1 to 3 hrs or so. The calcination may be performed in the air, or may be performed in an atmosphere where an oxygen partial pressure is lower than the air or in pure oxygen atmosphere. Note that, the main component and subcomponents may be mixed before or after the calcination.

Next, the calcined material is pulverized so as to obtain a pulverized material. The pulverization is performed to obtain powder having appropriate sinterbility by loosing aggregation of the calcined material. When the calcined material forms large lumps, it is roughly pulverized, and then wet-pulverized by a ball-mill or an attritor. The wet-pulverization is performed until an average particle size of the calcined material becomes preferably 0.05 to 1 μm or so.

Next, the pulverized material is granulated so as to obtain granules. The granulation is performed to make the pulverized material appropriate size of agglomerated particles, in order to convert the pulverized material to a suitable form for shaping. As for such granulation method, for example, a press granulation and a spray drying method and the like are exemplified. The spray drying method is the method of adding conventionally used binder such as polyvinyl alcohol and the like to the pulverized material, and atomizing the mixture and drying it at lower temperature in a spray dryer.

Next, the granules are formed into a predetermined form so that a shaped article is obtained. As for the method of forming of the granules, for example, drying forming, wet forming, extrusion and the like are exemplified. The drying forming is the method of packing granules into a mold and pressing it. A shape of the article is not particularly limited, although it may be suitably decided depending on a purpose of use, in the present embodiment, it is formed as a toroidal shape.

Next, the shaped article is fired so as to obtain a sintered body (ferrite composition of the present embodiment). The firing is performed to cause sintering where the powder is adhered among powder particles of the shaped article including large numbers of pores at a temperature which is below a melting point, in order to obtain dense sintered body. The firing is performed preferably at 840 to 940° C. during 2 to 5 hrs, normally. The firing may be performed in the air, or may be performed in an atmosphere where an oxygen partial pressure is lower than the air. The ferrite composition of the present embodiment has the above mentioned composition, thus it becomes possible to perform such low temperature firing.

The ferrite composition according to the present embodiment is produced through the above processes.

Hereinabove, the embodiment of the present invention was described, however the present invention is not limited to such embodiment, and the present invention can be attained in various different embodiments without exceeding the scope of the invention.

Figure 1A:
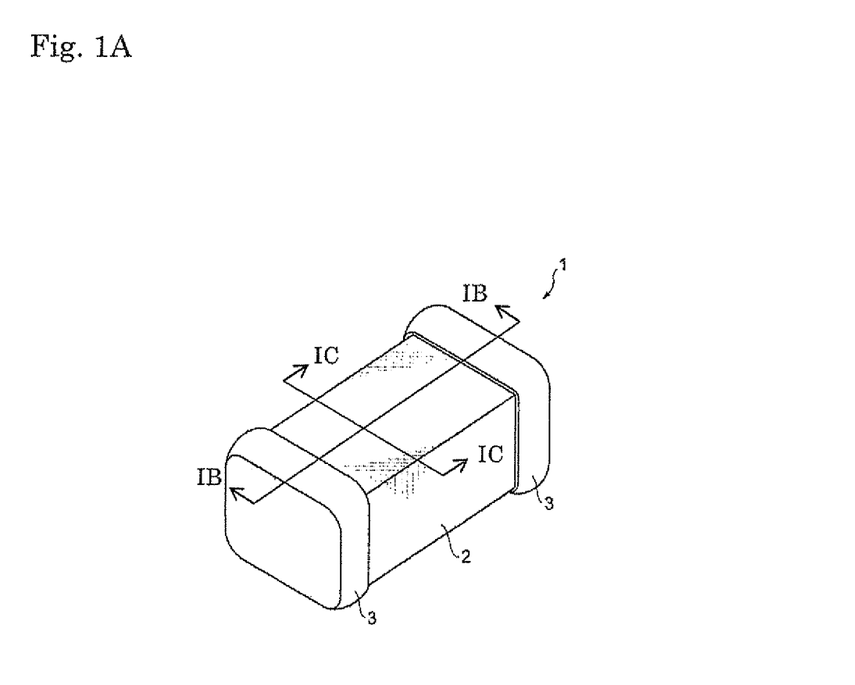
FIG. 1A is a perspective view of a multilayer inductor according to one embodiment of the present invention.

For example, in the above mentioned embodiment, although the ferrite composition is shaped into toroidal shape, the ferrite composition may be applied to, for example, a multilayer type electronic component such as multilayer inductor and the like, as shown in FIG. 1A.

Figure 1B:
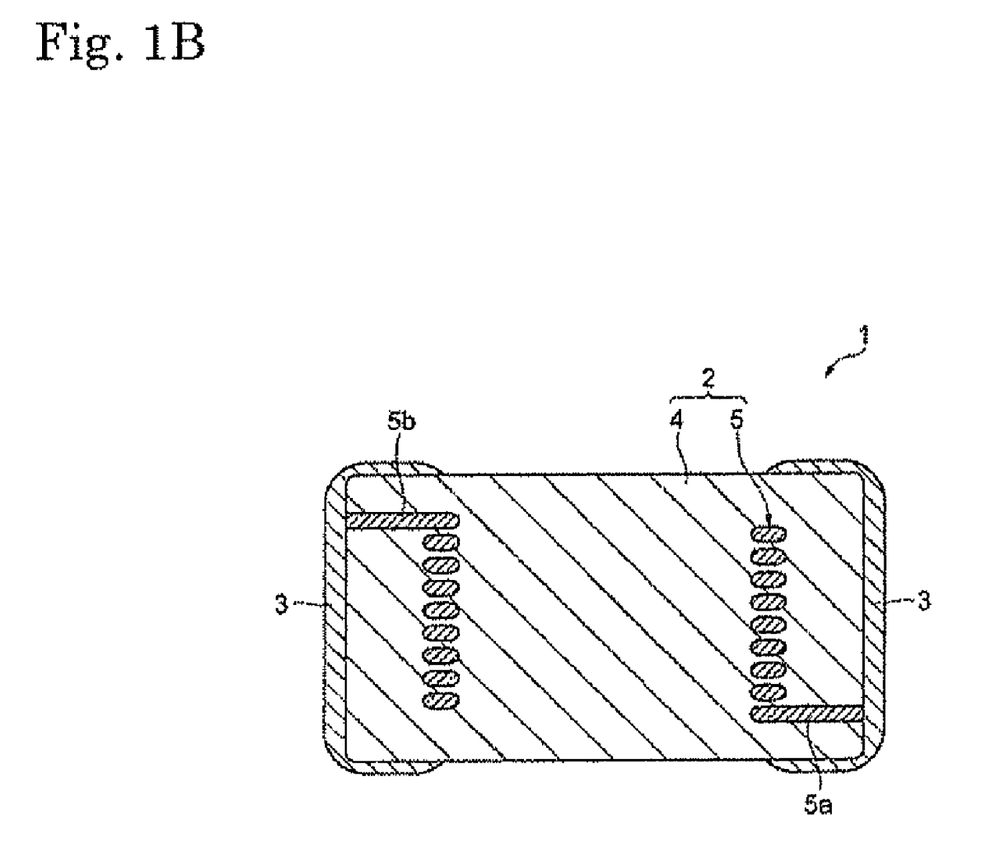
FIG. 1B is a cross sectional view which is cut along a line IB-IB in FIG. 1A
Figure 1C:
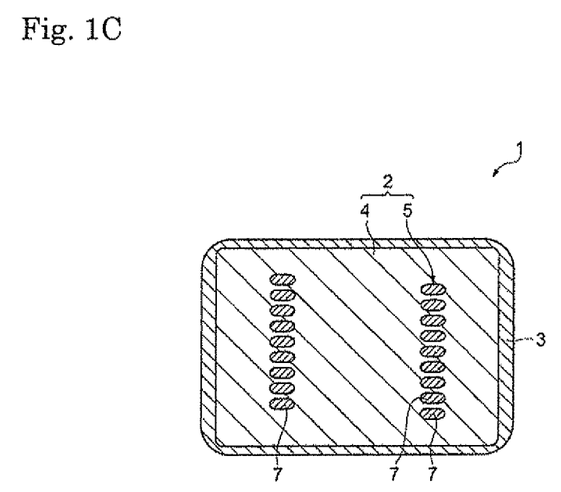
FIG. 1C is a cross sectional view which is cut along a line IC-IC in FIG. 1A.

In this case, firstly, a green sheet which includes the above mentioned ferrite composition is formed by using a conventionally known sheet method or printing method, a coil conductor is formed thereon as a predetermined pattern. Then, after stacking a plurality of green sheets where the coil conductor pattern is formed on, a multilayer green body 4 in which coil conductors 5 are formed as three dimensionally and spirally as shown in FIGS. 1B and 1C can be obtained by connecting respective coil conductor patterns 7 via through holes. The multilayer green body 4 is fired so that element 2 can be obtained and a multilayer type inductor shown in FIG. 1A can be obtained by forming terminal electrodes 3.

The above mentioned ferrite composition can be fired at 950° C. or below as low temperature firing, thus Ag can be used as a coil conductor.

EXAMPLES

Below, the present invention will be explained based on further detailed examples, however, the present invention is not limited to these examples.

Experiment 1

Firstly, as for materials of the main component, $Fe_2O_3$ powder, NiO powder, Cup powder and ZnO powder were prepared. As for materials of subcomponents, $SiO_2$ powder and $B_2O_3$ powder were prepared. Note that an average particle size of material of $SiO_2$ powder in sample 33 was 0.42 μm, and an average particle size of material of $SiO_2$ powder in other samples except for sample 33 were 0.025 μm.

Next, prepared materials of main component and subcomponents were weighed so as to have the amounts shown in Tables 1 and 2, and then wet-mixed by a ball mill for 16 hrs so as to obtain a mixture of materials.

Next, the obtained mixture of materials was calcined in the air at 750° C. for 4 hrs so as to obtain a calcined material, and then the calcined material was wet-pulverized by a ball mill for 16 hrs and a pulverized material was obtained.

Next, after drying the pulverized material, 1.0 wt % of polyvinyl alcohol as a binder was added to 100 wt % of the pulverized material, and the material was granulated by using a spray dryer so that granules were obtained. The granules was press-formed so that a shaped article having toroidal shape whose density was 3.20 Mg/m$^3$ was obtained (size: 13 mm of outer diameter×6 mm of inner diameter×3 mm of height).

Next, the obtained each shaped article was fired in the air at 900° C. for 2 hrs so that a toroidal core sample as a sintered body was obtained. Note that, a shaped article of sample 25 was fired at 970° C. For the obtained samples, the following characteristic evaluation was performed.

(Average Crystal Particle Size)

The samples were cut and an area of 100 μm$^2$ or more on the cutting plane was observed by a scanning electron microscope (SEM) so as to take a SEM picture.

Figure 2A:
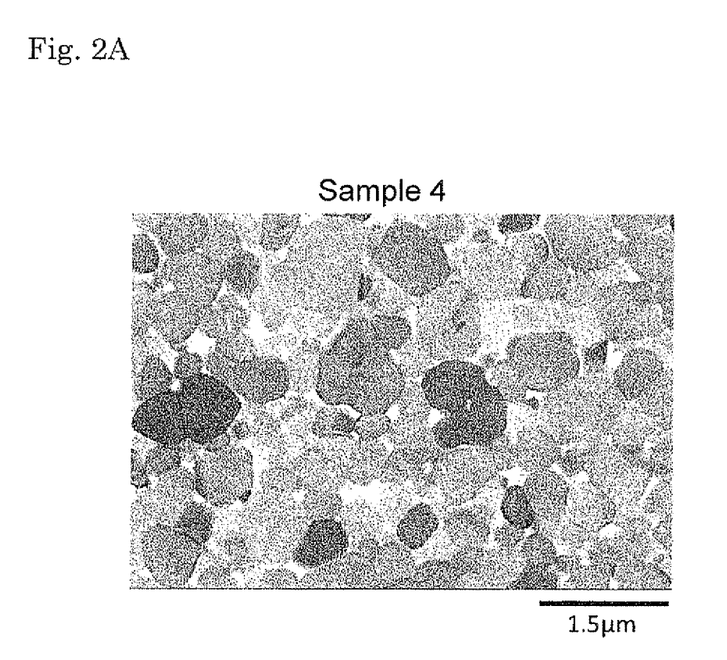
FIG. 2A is a SEM picture of a sample according to an example of the present invention and FIG. 2B is a SEM picture of a sample according to a comparative example of the present invention.
Figure 2B:
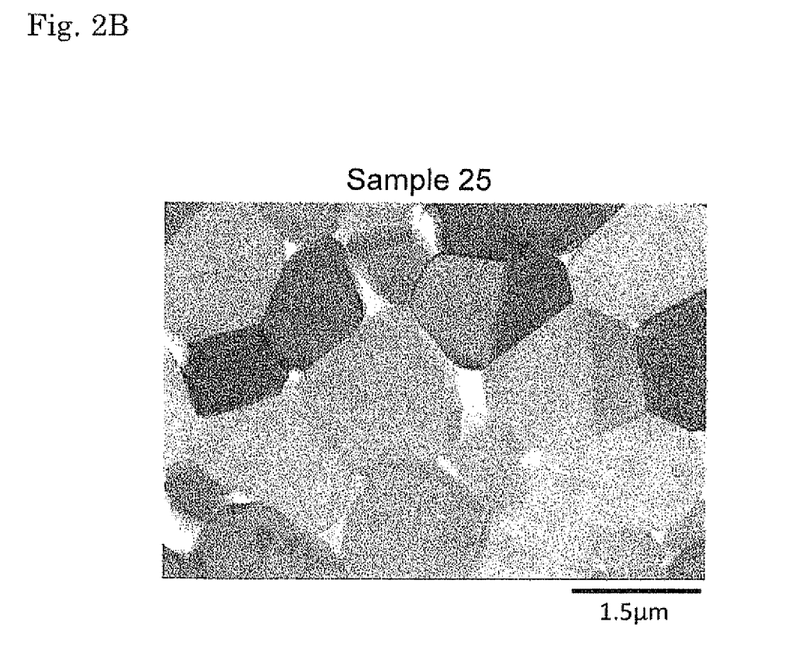

An image processing was performed to the SEM picture by software so as to distinguish a boundary of crystal particles and calculate an area of each crystal particle. Then, the calculated area of crystal particle was converted to circle equivalent diameter so that a crystal particle size was calculated. Note that, the number of crystal particles whose crystal particle diameter were calculated was 100. In the experiment 1, the average crystal particle diameter is preferably 0.2 to 1.1 μm. The results are shown in Tables 1 and 2. Also, a SEM picture of sample 4 is shown in FIG. 2A and a SEM picture of sample 25 is shown in FIG. 28.

(Initial Permeability (μi))

A copper wire was wound with 20 turns to the obtained toroidal core sample so that an initial permeability "μi" was measured by using an impedance analyzer (Hewlett Packard 4284A). As for measuring condition, measuring frequency was 100 kHz and measuring temperature was 25° C. The sample in which the initial permeability was 50 or more was determined as good. The results are shown in Tables 1 and 2.

(Superposed Direct Current Characteristic)

Figure 3:
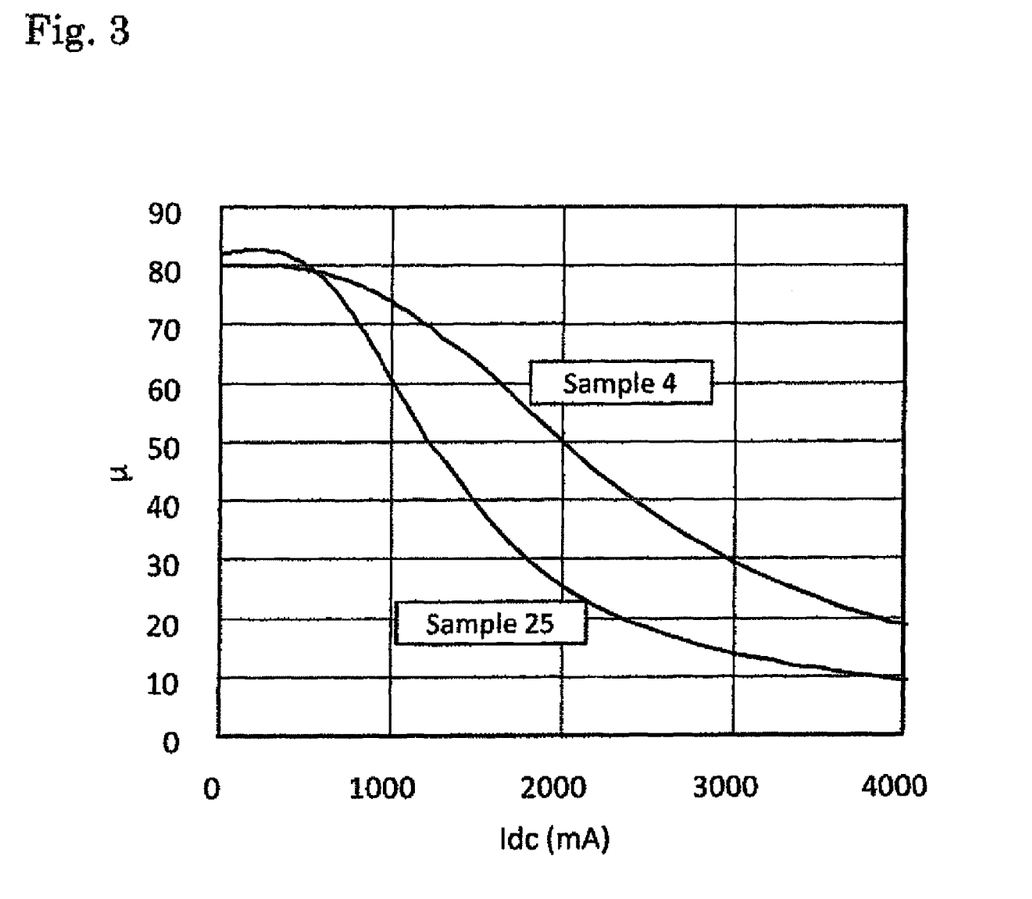
FIG. 3 is a graph showing a relation between permeability and superposed DC according to the example and comparative example of the present invention.

A copper wire was wound with 20 turns to the obtained toroidal core sample so that a change of the initial permeability with applying a direct current "Idc" (superposed direct current) was measured by using the impedance analyzer (Hewlett Packard 4284A). Then, a value of direct current at the time of being a value of permeability dropped by 10% from a value of the initial permeability "μi" to which the superposed direct current is not applied (Idc=0) was calculated as "Idc$_{10\% off}$". As for measuring condition, measuring frequency was 100 kHz and measuring temperature was 25° C. The sample in which "Idc$_{10\% off}$" was 580 mA or more was determined as good. The results are shown in Tables 1 and 2. Also, a graph showing a relation between the initial permeability "μi" and superposed direct current "Idc" of samples 4 and 25 is shown in FIG. 3.

(μi×(Idc)$^2$)

"μi×(Idc)$^2$" was calculated from the initial permeability (μi) and superposed direct current (Idc) obtained in the above. Generally, there is a tendency that when the "μi" is low, the "Idc" characteristic becomes good, and when the "μi" becomes high, the "Idc" characteristic decrease. Therefore, it is difficult to compare whether the "Idc" characteristic is good or bad. Thus, by introducing the above parameter, it becomes possible to evaluate the characteristic even when the "μi" is different, and to evaluate whether the "μi" and "Idc" are compatible. In the present examples, the sample in which "μi×(Idc)$^2$" was 43 or more was determined as good. The results are shown in Tables 1 and 2.

(Temperature Characteristic)

A copper wire was wound with 20 turns to the obtained toroidal core sample so that the permeabilities "μ" at −25° C. and 85° C. were measured by using the impedance analyzer (Hewlett Packard 4284A). Then, a change rate with respect to the permeability (initial permeability "μi") at 25° C. of the reference temperature was calculated. As for measuring condition, measuring frequency was 100 kHz and measuring temperature was 25° C. In the present example, the sample in which the change rate was from −4.0% or more to 8.0% or less were determined as good. The results are shown in Tables 1 and 2.

TABLE 1

| Sample No. | Composition | | | | | | Average crystal particle diamter (μm) | Characteristics | | | | |
|---|---|---|---|---|---|---|---|---|---|---|---|---|
| | Main component (mol %) | | | | Subcomponent (wt %) | | | μi (0 mA) | Idc (10% off) (mA) | μi × (Idc)$^2$ (A$^2$) | μ/μ$_{25° C.}$ | |
| | Fe$_2$O$_3$ | NiO | CuO | ZnO | SiO$_2$ | B$_2$O$_3$ | | | | | −25° C. | 85° C. |
| 1 | 47.8 | 15.4 | 10.8 | 26.0 | 1.5 | 0.03 | 0.96 | 130 | 582 | 44 | −1.9 | 4.0 |
| 2 | 48.5 | 13.5 | 6.0 | 32.0 | 2.0 | 0.15 | 0.54 | 141 | 585 | 48 | −2.0 | 3.0 |
| 3 | 48.0 | 20.3 | 10.8 | 20.9 | 2.0 | 0.20 | 0.42 | 102 | 889 | 81 | −0.5 | 1.2 |
| 4 | 48.5 | 24.6 | 10.8 | 16.1 | 2.0 | 0.20 | 0.49 | 80 | 1104 | 98 | −1.0 | 1.2 |
| 5 | 48.5 | 20.3 | 10.8 | 20.4 | 3.5 | 0.40 | 0.35 | 79 | 1106 | 97 | −3.0 | 1.6 |
| 6 | 49.6 | 16.6 | 10.8 | 23.0 | 2.0 | 0.30 | 0.60 | 125 | 700 | 61 | −1.3 | 2.2 |
| 7 | 48.5 | 27.7 | 12.8 | 11.0 | 2.0 | 0.15 | 0.42 | 63 | 1533 | 148 | −0.8 | 2.7 |
| 8 | 49.0 | 29.2 | 10.8 | 11.0 | 2.0 | 0.15 | 0.37 | 60 | 1480 | 131 | −0.5 | 1.2 |
| 9 | 48.5 | 22.7 | 10.8 | 18.0 | 2.0 | 0.15 | 0.43 | 94 | 912 | 78 | −0.8 | 1.9 |
| 10 | 48.5 | 24.3 | 10.8 | 16.4 | 0.6 | 0.05 | 1.01 | 81 | 925 | 69 | −3.6 | 6.3 |
| 11 | 48.5 | 20.3 | 10.8 | 20.4 | 2.0 | 1.20 | 0.92 | 94 | 873 | 72 | −3.5 | 4.0 |
| 12 | 48.5 | 20.3 | 10.8 | 20.4 | 5.0 | 0.50 | 0.34 | 52 | 1684 | 147 | −0.6 | 0.5 |

TABLE 2

| Sample No. | Composition | | | | | | | Average crystal particle diamter (μm) | Characteristics | | | | |
|---|---|---|---|---|---|---|---|---|---|---|---|---|---|
| | Main component (mol %) | | | | Subcomponent (wt %) | | | | μi (0 mA) | Idc (10% off) (mA) | μi × (Idc)² (A²) | μ/μ₂₅°C | |
| | Fe₂O₃ | NiO | CuO | ZnO | SiO₂ | B₂O₃ | Bi₂O₃ | | | | | −25° C. | 85° C. |
| 21 | 48.5 | 29.7 | 10.8 | 11.0 | 1.0 | — | — | 0.18 | 18 | 3041 | 166 | 3.8 | −4.0 |
| 22 | 48.5 | 29.7 | 10.8 | 11.0 | — | 0.20 | — | 1.73 | 132 | 272 | 10 | −6.9 | 7.8 |
| 23 | 49.0 | 36.0 | 8.8 | 6.1 | 0.5 | 0.20 | — | 1.17 | 42 | 780 | 26 | −1.0 | 5.8 |
| 24 | 48.5 | 20.3 | 10.8 | 20.4 | 2.0 | 2.10 | — | 2.64 | 135 | 393 | 21 | −6.3 | 11.8 |
| 25 | 48.5 | 24.6 | 10.8 | 16.1 | 2.0 | 0.20 | — | 1.24 | 82 | 719 | 42 | −13.0 | 10.3 |
| 26 | 48.5 | 20.3 | 10.8 | 20.4 | 6.5 | 1.00 | — | 0.12 | 21 | 2450 | 126 | 0.3 | −0.5 |
| 27 | 45.5 | 19.5 | 7.0 | 28.0 | 2.0 | 0.20 | — | 0.83 | 90 | 568 | 29 | −4.7 | 7.5 |
| 28 | 50.5 | 22.3 | 10.8 | 16.4 | 2.0 | 0.20 | — | 0.20 | 29 | 2318 | 156 | 1.1 | −0.9 |
| 29 | 48.5 | 4.7 | 10.8 | 36.0 | 2.0 | 0.20 | — | 0.93 | 3 | Not measured | — | 9380.8 | −9.8 |
| 30 | 48.0 | 20.3 | 18.0 | 13.7 | 2.0 | 0.20 | — | 1.26 | 96 | 412 | 16 | 13.0 | 12.0 |
| 31 | 48.0 | 29.1 | 2.0 | 20.9 | 2.0 | 0.20 | — | 0.30 | 24 | 2390 | 137 | 1.0 | −1.4 |
| 32 | 48.5 | 26.3 | 10.8 | 14.4 | 0.4 | 0.20 | — | 1.00 | 80 | 550 | 24 | −3.9 | 7.4 |
| 33 | 48.0 | 20.3 | 10.8 | 20.9 | 2.0 | 0.40 | — | 1.20 | 97 | 630 | 38 | 9.0 | 13.0 |
| 34 | 48.2 | 23.2 | 8.6 | 20.0 | — | — | 0.4 | 0.6 | 105 | 409 | 18 | −8.2 | 9.1 |

From the table 1, when a compositional range of the main component was within the range of the present invention, and contents of the silicon oxide and boron oxide which were subcomponents were within the range of the present invention (samples 1 to 12), it was confirmed that the initial permeability and the superposed DC characteristic were good, and the temperature characteristic of the initial permeability was good. Further, all of the samples 1 to 12 were fired at 900° C., it was also confirmed that low temperature firing was possible.

On the other hand, from the table 2, when either the silicon oxide or boron oxide is not included as the subcomponent (samples 21 and 22), or when the either content of the silicon oxide or boron oxide was out of the range of the present invention (samples 24, 26 and 32), it was confirmed that the initial permeability "μi" and temperature characteristic were tend to be deteriorated.

Note that, when the silicon oxide and boron oxide were not included as subcomponents and bismuth oxide was included as a subcomponent (sample 34), it was confirmed that the initial permeability "μi" and temperature characteristic were deteriorated.

Also, from the table 2, when the contents of components composing the main component were out of the range of the present invention (samples 23 and 27 to 31), it was confirmed that at least the initial permeability "μi" tends to be deteriorated.

Also, when the average crystal particle size was out of the preferable range of the present invention (sample 25), it was confirmed that the temperature characteristic tends to be slightly deteriorated. Further, when comparing the sample 4 and sample 25, even though the composition thereof is same, the firing temperature (970° C.) of the sample 25 became higher. In this case, as it is clear from FIGS. 2A and 2B, the average crystal particle size of the sample 25 became considerably larger. As a result, as it is clear from FIG. 3, it was confirmed that the permeability tends to become smaller when the superposed DC "Idc" is applied. Therefore, it was confirmed that by having a predetermined fine-structure as well as setting the composition within the specific range, the ferrite composition according to the present invention can improve the effect of the present invention further.

Further, from the table 2, when SiO₂ powder having large average particle diameter of material was used (sample 33), it was confirmed the it is preferable to use the fine material since the average crystal particle size becomes too large.

Experiment 2

Except that compounds shown in Table 3 were used as subcomponents and contents thereof were set as amounts shown in the table 3, a toroidal core sample was produced as similar with the experiment 1 and characteristic evaluations as similar with the experiment 1 were performed. The results are shown in Table 3.

Note that, for sample 54, a glass composition where contents of the subcomponents with respect to 100 wt % of the main component becomes values shown in the Table 3 was used. Specifically, 2.5 wt % of the glass composition which includes 80 wt % of SiO₂, 17 wt % of B₂O₃, 2.1 wt % of K₂O was added to 100 wt % of the main component. Also, an average particle diameter of samples including K₂O is preferably 0.2 to 1.3 μm.

TABLE 3

| Sample No. | Composition | | | | | | | | | | Average crystal particle diamter (μm) | Characteristics | | | | |
|---|---|---|---|---|---|---|---|---|---|---|---|---|---|---|---|---|
| | Main component (mol %) | | | | Subcomponent (wt %) | | | | | | | μi (0 mA) | Idc (10% off) (mA) | μi × (Idc)² (A²) | μ/μ₂₅°C | |
| | Fe₂O₃ | NiO | CuO | ZnO | SiO₂ | B₂O₃ | K₂O | Li₂O | Na₂O | SnO₂ | | | | | −25° C. | 85° C. |
| 41 | 47.4 | 20.3 | 10.8 | 21.5 | 2.0 | — | — | 0.04 | — | — | 0.32 | 80 | 489 | 19 | −3.2 | 6.0 |
| 42 | 47.4 | 20.3 | 10.8 | 21.5 | 2.0 | — | — | — | 0.12 | — | 0.80 | 79 | 522 | 22 | −5.0 | 8.4 |
| 43 | 47.4 | 20.3 | 10.8 | 21.5 | 2.0 | — | 0.14 | — | — | — | 0.84 | 85 | 690 | 40 | −4.0 | 6.6 |

TABLE 3-continued

| Sample No. | Composition | | | | | | | | | | Average crystal particle diamter (μm) | Characteristics | | | | |
|---|---|---|---|---|---|---|---|---|---|---|---|---|---|---|---|---|
| | Main component (mol %) | | | | Subcomponent (wt %) | | | | | | | μi (0 mA) | Idc (10% off) (mA) | μi × (Idc)² (A²) | μ/μ$_{25°C}$ | |
| | $Fe_2O_3$ | NiO | CuO | ZnO | $SiO_2$ | $B_2O_3$ | $K_2O$ | $Li_2O$ | $Na_2O$ | $SnO_2$ | | | | | −25° C. | 85° C. |
| 44 | 47.4 | 20.3 | 10.8 | 21.5 | 2.0 | 0.05 | 0.14 | — | — | — | 1.30 | 99 | 930 | 86 | −1.6 | 1.7 |
| 45 | 47.4 | 20.3 | 10.8 | 21.5 | 2.0 | 0.13 | 0.05 | — | — | — | 1.12 | 96 | 980 | 92 | −3.6 | 2.9 |
| 46 | 47.4 | 20.3 | 10.8 | 21.5 | 2.0 | 0.30 | 0.01 | — | — | — | 0.98 | 90 | 1000 | 90 | −2.0 | 2.3 |
| 47 | 47.4 | 20.3 | 10.8 | 21.5 | 2.0 | 0.15 | — | — | — | 0.3 | 1.04 | 89 | 1050 | 98 | −0.8 | 1.1 |
| 48 | 47.4 | 20.3 | 10.8 | 21.5 | 2.0 | 0.15 | — | — | — | 1.0 | 0.84 | 83 | 1158 | 111 | −0.1 | 0.4 |
| 49 | 47.4 | 20.3 | 10.8 | 21.5 | 2.0 | 0.15 | — | — | — | 2.0 | 0.92 | 78 | 1230 | 118 | 1.1 | −0.7 |
| 50 | 47.4 | 20.3 | 10.8 | 21.5 | 2.0 | 0.10 | 0.07 | — | — | 0.3 | 1.09 | 88 | 1103 | 107 | −0.5 | 0.8 |
| 51 | 47.4 | 20.3 | 10.8 | 21.5 | 2.0 | 0.10 | 0.07 | — | — | 1.0 | 0.98 | 81 | 1230 | 123 | 0.8 | −0.1 |
| 52 | 47.4 | 20.3 | 10.8 | 21.5 | 2.0 | 0.10 | 0.07 | — | — | 2.0 | 0.95 | 72 | 1430 | 147 | 1.0 | −0.6 |
| 53 | 47.4 | 20.3 | 10.8 | 21.5 | 2.0 | — | — | — | — | 2.0 | 0.13 | 10 | — | — | −2.1 | 1.3 |
| 54 | 47.4 | 20.3 | 10.8 | 21.5 | 2.0 | 0.42 | 0.03 | — | — | — | 0.85 | 93 | 780 | 57 | −3.5 | 3.0 |
| 3 | 48.0 | 20.3 | 10.8 | 20.9 | 2.0 | 0.20 | — | — | — | — | 0.42 | 102 | 889 | 81 | −0.5 | 1.2 |

From the table 3, when the silicon oxide and boron oxide are included as the subcomponents, and further the content of the potassium oxide or tin oxide were within the preferable range of the present invention (samples 44 to 49), it was confirmed that the initial permeability, superposed DC characteristic and temperature characteristic can be improved.

Note that, when the both potassium oxide and tin oxide were included (samples 50 to 52), it was confirmed that the initial permeability, superposed DC characteristic and temperature characteristic can be improved by setting the respective contents within the preferable range of the present invention.

Also, when the glass composition was used as the subcomponent (sample 54), it was confirmed that the effect of the present invention can be obtained.

On the other hand, when the boron oxide was not included (samples 43 to 53) even though the potassium oxide or tin oxide is included, it was confirmed that the effect of the present invention cannot be obtained. Also, when the lithium oxide or sodium oxide were used (samples 41 and 42), it was confirmed that the effect of the present invention cannot be obtained.

The invention claimed is:

1. A ferrite composition comprising:
   a main component including 46.0 to 49.8 mol % of iron oxide in terms of $Fe_2O_3$, 5.0 to 14.0 mol % of copper oxide in terms of CuO and 8.0 to 32.0 mol % of zinc oxide in terms of ZnO, and a remainder of said main component is composed of nickel oxide; and
   as subcomponents, with respect to 100 wt % of said main component, 0.5 to 6.0 wt % of silicon oxide in terms of $SiO_2$ and 0.01 to 2.0 wt % of boron oxide in terms of $B_2O_3$.

2. The ferrite composition as set forth in claim 1 further comprising:
   as a subcomponent, 0.01 to 0.17 wt % of potassium oxide in terms of $K_2O$ with respect to 100 wt % of said main component.

3. The ferrite composition as set forth in claim 1 further comprising:
   as a subcomponent, 0.3 to 2.0 wt % of tin oxide in terms of $SnO_2$ with respect to 100 wt % of said main component.

4. The ferrite composition as set forth in claim 2 further comprising:
   as a subcomponent, 0.3 to 2.0 wt % of tin oxide in terms of $SnO_2$ with respect to 100 wt % of said main component.

5. The ferrite composition as set forth in claim 1, wherein an average crystal particle size of a crystal particle included in said ferrite composition is 0.2 to 1.1 μm.

6. The ferrite composition as set forth in claim 2, wherein an average crystal particle size of a crystal particle included in said ferrite composition is 0.2 to 1.3 μm.

7. The ferrite composition as set forth in claim 3, wherein an average crystal particle size of a crystal particle included in said ferrite composition is 0.2 to 1.1 μm.

8. The ferrite composition as set forth in claim 4, wherein an average crystal particle size of a crystal particle included in said ferrite composition is 0.2 to 1.3 μm.

9. An electronic component comprising said ferrite composition as set forth in claim 1.

10. An electronic component comprising said ferrite composition as set forth in claim 2.

11. An electronic component comprising said ferrite composition as set forth in claim 3.

12. An electronic component comprising said ferrite composition as set forth in claim 4.

* * * * *